Feb. 24, 1931.  W. GERMANN  1,794,287
DOUBLE SLIP POINT FOR RAILS
Filed Oct. 13, 1930

Inventor:
W. Germann

Patented Feb. 24, 1931

1,794,287

UNITED STATES PATENT OFFICE

WILHELM GERMANN, OF DORTMUND, GERMANY, ASSIGNOR TO THE FIRM VEREINIGTE STAHLWERKE AKTIENGESELLSCHAFT, OF DUSSELDORF, GERMANY

DOUBLE-SLIP POINT FOR RAILS

Application filed October 13, 1930, Serial No. 488,482, and in Germany September 2, 1929.

It is the object of the present invention to provide an improvement on double slip points with tongues disposed outside the diamond of the type wherein the centre piece of rail which is passed over on both sides is composed of two adjoining rails that are firmly connected together by means of filling pieces and bolts.

It has been found that bolt-connections on parts of the permanent way became loose in the course of time as the result of the varying stresses placed upon them in actual service. The improvement which is the object of the invention does away with this defect by effecting the connection instead of by bolts by welding or by welding and bolts. In this way a junction of the two rails forming the centre piece of rail is obtained which will permanently resist all stresses.

In a particularly advantageous construction of the connection the heads of the rails forming the centre piece of rail are machined on their oppositely disposed sides for the distance they are adjoining each other, in such a way that the groove thus formed may be filled with welding material, thereby considerably strengthening the connection.

Figure 1:
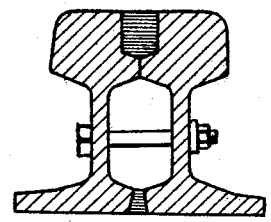

Fig. 1 of the drawing shows a cross section of the welding on the narrowest point of the centre piece of rail, the rails being connected together at their feet as well as at their heads which are provided with recesses.

Figure 2:
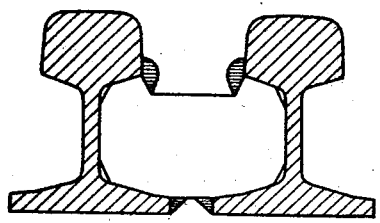

Fig. 2 shows the welding near the end of the centre piece of rail, the heads of the rails being already such a distance apart from each other that an interposed filling piece may also be welded on.

By welding the two centre rails together to form an entirety, the durability of the connection is considerably increased and the rolling stock will pass over more smoothly.

According to the invention the welding and the connection by means of bolts may be resorted to also simultaneously in order to secure the perfect junction of the centre piece of rail even if the welding seams should crack.

Having thus described my invention what I claim as new and desire to secure by Letters Patent is:

1. Double slip point with tongues disposed outside the diamond as well as a centre piece of rail passed over by the rolling stock on both sides which consists of two rails that are in contact with each other and firmly connected together by welding, the heads of the two rails being machined on their oppositely disposed sides for the distance they are adjoining each other in such a way that the groove thus formed may be filled with welding material.

2. Double slip point with tongues disposed outside the diamond and a centre piece of rail passed over by the rolling stock on both sides of same which consists of two rails that are in contact with each other and are firmly connected together by welding and by means of bolts, the heads of the two rails being machined on their oppositely disposed sides for the distance they are adjoining each other in such a way that the groove thus formed may be filled with welding material.

WILHELM GERMANN.